United States Patent
Ho et al.

(10) Patent No.: US 9,913,193 B2
(45) Date of Patent: Mar. 6, 2018

(54) ACCESS POINT STEERING

(71) Applicant: QUALCOMM Incorporated, San Diego, CA (US)

(72) Inventors: Sai Yiu Duncan Ho, San Diego, CA (US); Bharat Bhushan Chakravarty, Karnataka (IN); Brian Michael Buesker, San Diego, CA (US); Ramaswamy Venkateshwaran, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 14/855,735

(22) Filed: Sep. 16, 2015

(65) Prior Publication Data

US 2016/0249267 A1    Aug. 25, 2016

(51) Int. Cl.
*H04W 36/30* (2009.01)
*H04W 36/08* (2009.01)
*H04W 48/20* (2009.01)
*H04W 88/08* (2009.01)

(52) U.S. Cl.
CPC .......... *H04W 36/30* (2013.01); *H04W 36/08* (2013.01); *H04W 48/20* (2013.01); *H04W 88/08* (2013.01)

(58) Field of Classification Search
CPC ... H04W 36/08; H04W 36/38; H04W 36/385; H04W 36/30; H04W 48/20; H04W 88/08
See application file for complete search history.

(56) References Cited

U.S. PATENT DOCUMENTS

| | | |
|---|---|---|
| 7,062,296 B2 | 6/2006 | Brennan et al. |
| 7,277,409 B1 | 10/2007 | Thermond et al. |
| 7,450,552 B2 | 11/2008 | Behroozi |
| 7,480,264 B1 | 1/2009 | Duo et al. |
| 2005/0135239 A1 | 6/2005 | Cromer et al. |
| 2005/0213579 A1 | 9/2005 | Iyer et al. |

(Continued)

FOREIGN PATENT DOCUMENTS

| | | |
|---|---|---|
| EP | 2533573 | 12/2012 |
| EP | 2595433 | 5/2013 |

(Continued)

OTHER PUBLICATIONS

"PCT Application No. PCT/US2016/012885 International Search Report", Jun. 28, 2016, 21 pages.

(Continued)

*Primary Examiner* — Omar Ghowrwal
(74) *Attorney, Agent, or Firm* — DeLizio Law, PLLC

(57) ABSTRACT

A first access point (AP) detects a communication between a client device and a second AP. The first AP determines at least one criteria for AP steering is satisfied. AP steering is then used by the first AP to cause the client device to associate with the first AP, or a particular network of the first AP. For example, the first AP may transmit a disassociation message to the client device. The disassociation message may identify the second AP associated with the client device and cause the client device to disassociate from the second AP. After the client device disassociates from the second AP, the client device may select and associate with the first AP. The first AP may manage which network the client device associates with using a blacklist at the first AP.

33 Claims, 8 Drawing Sheets

(56) References Cited

U.S. PATENT DOCUMENTS

| | | | |
|---|---|---|---|
| 2006/0072761 A1* | 4/2006 | Johnson | H04L 63/0442 380/270 |
| 2008/0049687 A1 | 2/2008 | Shankar et al. | |
| 2008/0096575 A1 | 3/2008 | Aragon et al. | |
| 2009/0327736 A1* | 12/2009 | Cam-Winget | H04L 63/061 713/181 |
| 2010/0299518 A1* | 11/2010 | Viswanathan | H04L 9/083 713/152 |
| 2011/0053599 A1* | 3/2011 | Hsu | H04W 36/08 455/436 |
| 2012/0281585 A1* | 11/2012 | Zhang | H04W 36/0033 370/252 |
| 2013/0259005 A1 | 10/2013 | Kulkarni | |
| 2013/0272269 A1 | 10/2013 | Srivastava et al. | |
| 2014/0003286 A1 | 1/2014 | Estevez et al. | |
| 2016/0078758 A1* | 3/2016 | Basalamah | G08G 1/0112 701/118 |
| 2016/0323786 A1* | 11/2016 | Syed | H04W 36/0038 |

FOREIGN PATENT DOCUMENTS

| | | |
|---|---|---|
| WO | 2004098108 | 11/2004 |
| WO | 2012166671 | 12/2012 |

OTHER PUBLICATIONS

"PCT Application No. PCT/US2016/012885 Invitation to Pay Additional Fees and Partial Search Report", Apr. 7, 2016, 7 pages.

Chappell, "Troubleshooting with Wireshark", Wireshark Go Deep, https://www.wireshark.org/, SHARK.FEST '15 will be held from Jun. 22-25 at the Computer History Museum in Mountain View, CA., Jun. 2015, 4 pages.

Rapp, "The to DS and From DS Fields", https://dalewifisec.wordpress.com/2014/05/17/the-to-ds-and-from-ds-fields/, daleswifisec, May 17, 2014, 5 pages.

"PCT Application No. PCT/US2016/012885 International Preliminary Report on Patentability", May 31, 2017, 33 pages.

* cited by examiner

ACCESS POINT STEERING

RELATED APPLICATIONS

This application claims the priority benefit of the Indian Patent Application Serial No. 548/MUM/2015 filed Feb. 20, 2015.

TECHNICAL FIELD

Embodiments of the disclosed subject matter generally relate to the field of wireless communication, and more particularly to access point steering.

BACKGROUND

Wireless communication technologies can support wireless network access for a client device via a wireless access point ("AP"). A wireless local area network ("WLAN") may include multiple APs, and a client device may transition from one AP to another AP. For example, a client device may initially associate with an AP that has the strongest signal. Once associated with a particular AP, the client device may remain associated with that AP until that AP's signal strength becomes weak. As the client device moves to another location in the WLAN, the client device can disassociate from that AP, and associate with another AP that has stronger signal strength.

SUMMARY

Various embodiments for AP steering are disclosed. Using AP steering, a first AP may manipulate a wireless environment to cause a client device to become associated with the first AP or with a particular network administered by the first AP.

In one embodiment, a first AP detects a communication between a client device and a second AP. The communication may be indicative that the client device is associated with the second AP. The first AP may determine that at least one criteria for access point steering is satisfied. The first AP may transmit a disassociation message from the first AP to the client device in response to determining that the at least one criteria for AP steering are satisfied. The disassociation message identifies the second AP to cause the client device to disassociate from a second AP. After the client device disassociates from the second AP, the client device may select and associate with the first AP.

In another embodiment, an AP manages network association. The AP detects a first association request from a client device, wherein the first association request identifies a first network administered by the AP. The AP determines whether a blacklist includes an indication of the client device. The AP denies the first association request based, at least in part, on a determination that the blacklist includes the indication of the client device. The AP detects a second association request from the client device, wherein the second association request identifies a second network administered by the AP. The AP grants the second association request.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
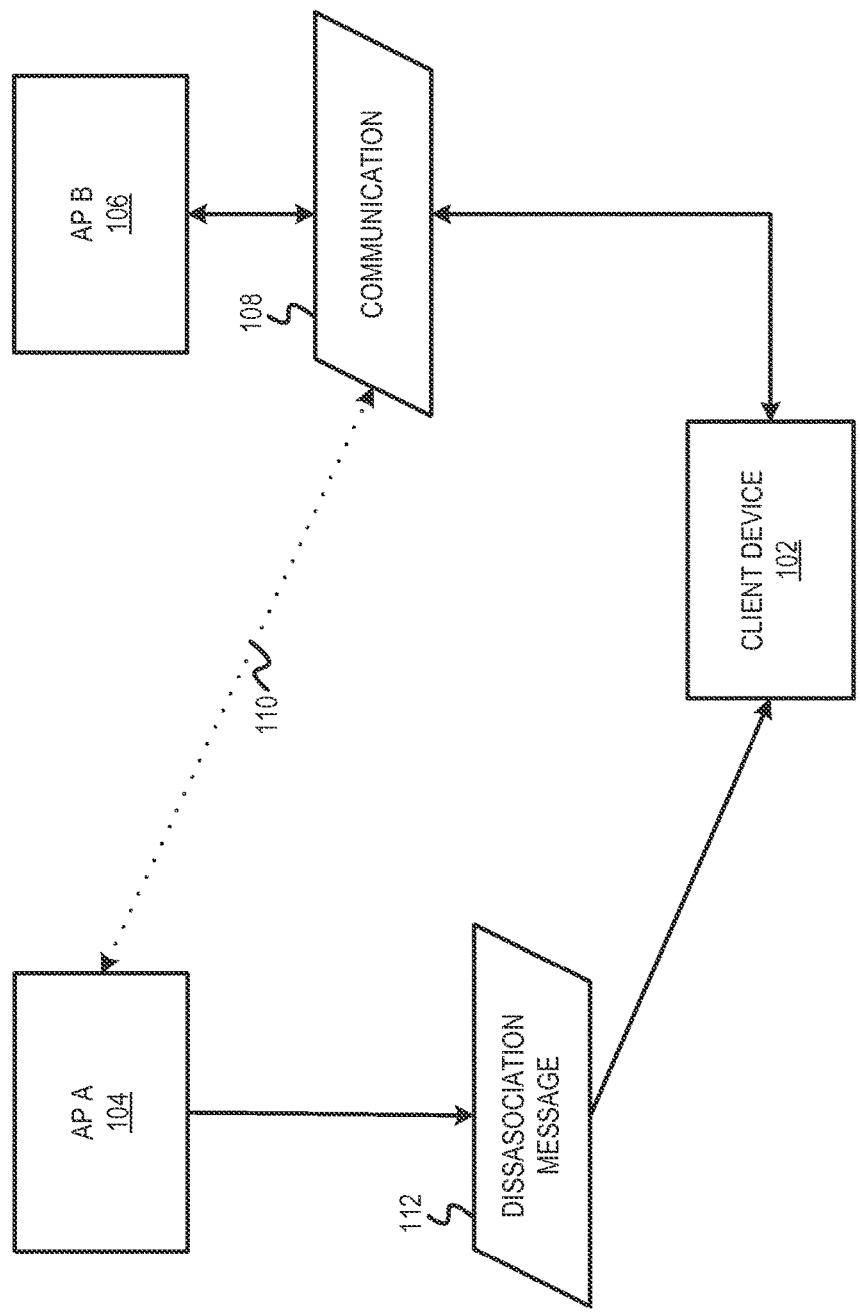
FIG. 1 depicts an example WLAN in which a first AP steers a client device from a second AP to the first AP in accordance with embodiments of this disclosure.

The description that follows includes exemplary systems, methods, techniques, instruction sequences and computer program products that embody techniques of the present disclosed subject matter. However, the described embodiments may be practiced without these specific details. For instance, although examples refer to the Institute of Electrical and Electronics Engineers (IEEE) 802.11 wireless protocols, the disclosures herein apply to other wireless networking protocols that support wireless communication. In other instances, well-known instruction instances, protocols, structures and techniques have not been shown in detail in order not to obfuscate the description.

Using wireless communication technologies, a client device may transition between different APs to gain access to a WLAN. Traditionally, a client device may initially associate with the AP having a strongest signal strength. Once associated with a particular AP, the client device may remain associated with that AP to prevent a transition to another AP until necessary to do so. The decision to remain with a current AP or transition to another AP is traditionally based on signal strength of signals between the client device and the APs. However, a client device may not search for another AP unless the signal strength for the current AP falls below a particular threshold. Therefore, the client device may remain associated with the current AP even when the client device may be better served by another AP. For example, another AP may administer a network with a higher bandwidth than a network administered by the current AP. In another example, another AP may administer a network having a higher priority than a network administered by the current AP.

An AP may also administer a public network (having open access) in addition to a private network (requiring credentials for access). The client device may be affiliated with a private network of a first AP. For example, the client device and first AP may belong to a same operator. However, if the client device remains associated with a second AP, the client device may not associate with the first AP, or gain access to the private network.

When there are more than one AP available for a client device, it may be desirable for one of the APs to use AP steering to manage which AP the client device will use. AP steering refers to techniques to steer a client device to associate with a particular AP and/or a particular network of an AP. In some embodiments, a first AP may detect a communication between a client device and a second AP. The first AP may determine that it has previously associated with the client device, or that the client device is affiliated with the first AP. The first AP may also determine that the client device meets at least one criteria for AP steering. For example, the criteria may include a determination of whether signal strength of signals emitted by the client device (and as measured by the first AP) is greater than a threshold. The first AP may transmit, to the client device, a disassociation message that identifies the second AP. The disassociation message may cause the client device to disassociate from the second AP. After the client device disassociates from the second AP, the client device may find and associate with the first AP. Embodiments of how the first AP can steer a client device from a second AP to the first AP are described below with reference to FIGS. 1 and 2.

In some embodiments, an AP steers a client device from a first network (e.g., a public network) administered by the AP to a second network (e.g., a private network) administered by the same AP. Embodiments of how an AP can steer a client device from a first network to a second network of the AP are described below with reference to FIGS. 3 and 4.

FIG. 1 depicts an example system having two APs. FIG. 1 depicts a client device 102, an AP A 104, and an AP B 106. AP A 104 may implement AP steering to cause the client device 102 to associate with AP A 104.

AP A 104 and AP B 106 may provide partially overlapping wireless coverage areas. For example, consider a scenario in which there are two neighboring houses. Each house may have an AP. As a resident of a first house passes a neighboring house, the resident's client device may associate with a public network administered by the neighbor's AP (e.g., AP B 106). If the signal strength of the neighbor's AP does not fall below a threshold, the client device may remain associated with the neighbor's AP, even though the client device may be affiliated with another AP (e.g., AP A 104) in the first house. In this scenario, it may be desirable for AP A 104 to use AP steering to cause the client device to disassociate from AP B 106. After disassociating from AP B 106, the client device may scan and select AP A 104.

In the example of FIG. 1, AP A 104 may administer a first network (e.g., a private network) and a second network (e.g. a public network). Similarly, AP B 106 may administer a first and a second network (e.g., a private and a public network) that are different from the networks administered by AP A 104. The networks administered by the AP A can differ from each other by bandwidth, type, priority, and/or security, etc. Similarly, the networks administered by the AP B can differ from each other by bandwidth, type, priority, and/or security, etc.

If client device 102 is affiliated with AP A 104, both the networks of AP A 104 may be available for use by the client device 102. Conversely, if client device 102 is not affiliated with AP B 106, then only the first network of AP B 106 may be available for use by the client device 102. For example, one user may own and/or operate both AP A 104 and the client device 102, while another user may own and/or operate AP B 106. In this example, the second network of AP B 106 is not available to the client device 102, since AP B 106 is controlled by a different user from the user of the client device 102.

When a client device is affiliated with a particular AP, that AP may be referred to as a primary wireless access point for the client device. In the example of FIG. 1, AP A 104 may be a primary wireless access point for the client device 102. AP B 106 may be referred to as the subordinate AP to the client device 102. However, AP B 106 may be a primary AP to another client device.

There are various techniques for specifying that a particular AP is a primary AP for a particular client device. For example, AP A 104 may receive input (e.g., user input) specifying that AP A 104 is a primary AP for the client device 102. To specify AP A 104 as the client device's primary AP, AP A 104 may add the client device's 102 media access control ("MAC") address to a list. As another example, AP A 104 may determine that AP A 104 is a primary AP for a client device that associates with the first network administered by AP A 104. In doing so, AP A 104 may maintain a list of all client devices that associate with AP A's 104 first network.

The client device 102 may initially associate with AP B 106. The client device 102 may associate with AP B 106 when the client device 102 receives a beacon message or a probe response message from AP B 106. The client device 102 may associate with AP B 106 by transmitting authentication messages, association requests/responses, etc.

AP A 104 may detect (shown as dotted line 110) a communication 108 between the client device 102 and AP B 106, and extract identification data from the communication 108. To detect the communication 108, AP A 104 may tune a radio to a channel used by the client device 102 and AP B 106. For example, to determine the channel, AP A 104 may scan available channels until detecting the communication 108. AP A 104 may extract identification data from the communication 108. The identification data may include a source identifier and destination identifier that indicate a source and destination of the communications. For example, the source identifier may indicate the client device 102, whereas the destination identifier may indicate AP B 106.

AP A 104 may then transmit to the client device 102 a disassociation message 112 that identifies AP B 106. Typically, a disassociation message sent from AP A 104 would identify itself (AP A 104). However, in accordance with an embodiment of this disclosure, the disassociation message 112 identifies AP B 106 to spoof a disassociation message that the client device 102 believes is from AP B 106. The client device 102 may receive the disassociation message 112 and disassociate with AP B 106. The particular operations performed to disassociate from AP B 106 may vary. For example, the client device 102 may merely stop communicating with AP B 106, or may transmit an acknowledgement to AP B 106. Various embodiments of how AP A 104 can dissociate the client device 102 from AP B 106 are described below with reference to FIG. 2.

Once the client device 102 disassociates with AP B 106, the client device 102 may search for available APs. The client device 102 may determine that AP A 104 is available. The client device 102 may determine that AP A 104 has the strongest and/or most reliable signal and associate with AP A 104. In some wireless environments, the client device 102 may attempt to associate back with AP B 106 after disassociating with AP B 106. In this case, AP A 104 may transmit additional disassociation messages to the client device 102 that identifies AP B 106 as the sender.

Thus, causing the client device 102 to disassociate from AP B 106 may not guarantee that the client device 102 will associate with AP A 104. After disassociating from AP B 106, the client device 102 may attempt to reassociate with AP B 106. If AP B 106 grants the reassociation request from the client device 102, the client device 102 may not attempt to associate with AP A 104. In such instances, AP A 104 may periodically transmit the additional disassociation message(s) that identify AP B 106. AP A 104 may determine whether additional criteria are satisfied prior to transmitting the additional disassociation message(s) to the client device 102.

AP A 104 may use one or two radios for communication with the client devices and for implementing the AP steering. If AP A 104 includes a single radio, software of AP A 104 may be modified to communicate with the client devices (e.g., using an active channels) and to scan other channels. AP A 104 may scan the other channels to attempt to detect communication between the client device 102 and other AP(s). In the single radio embodiment, AP A 104 may not transmit and/or receive communication on the active channel when scanning the other channels. Thus, the single radio embodiment can negatively impact network performance. In another embodiment, AP A 104 includes multiple radios, allowing AP A 104 to implement AP steering without affecting communication with the client device 102. For example, a first radio may be used to communicate with other client devices over a network administered by AP A 104. The second radio may be used to detect communication between the client device 102 and APB 106.

It is also possible for each of AP A 104 and AP B 106 to separately determine that they are a primary AP for the client device 102. If the client device 102 is within range of both APs 104 and 106, each of AP A 104 and AP B 106 may start transmitting disassociation messages identifying the other AP. Various mechanisms can be implemented to prevent repeated disassociations. For example, one of APs 104 and 106 may limit the number of disassociation messages sent to the client device 102.

Figure 2:
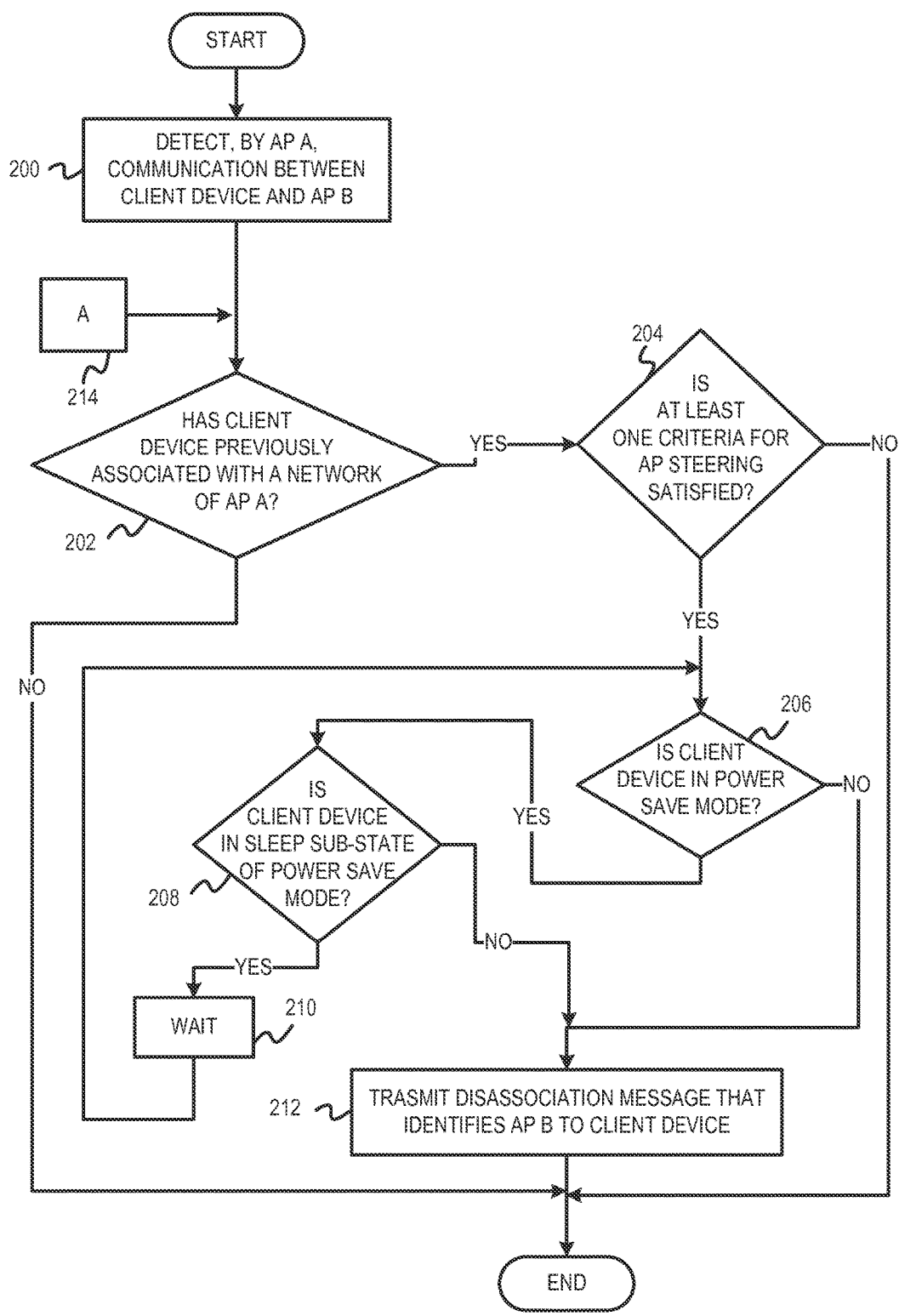
FIG. 2 depicts a flowchart of example operations for AP steering using a disassociation message in accordance with embodiments of this disclosure.

FIG. 2 depicts a flowchart of example operations to steer a client device from a subordinate AP to a primary AP. The operations depicted in FIG. 2 may be performed by a primary AP (such as AP A 104 of FIG. 1) or any suitable device configured to perform AP steering.

At block 200, a primary AP (e.g., AP A 104) detects a communication between a client device (e.g., the client device 102) and a subordinate AP (e.g., AP B 106). When a communication is sent between the client device and the subordinate AP, the primary AP also receives the communication. The primary AP may receive the communication via a single radio if only one radio is used. The primary AP may receive the communication via a second radio if multiple radios are used. The radio may be tuned to a channel used by the client device and the subordinate AP. The primary AP may decode the communication, and extract identification data from the communication. The identification data may identify the client device and the subordinate AP. The primary AP may also determine additional data related to the communication. The additional data may indicate the channel used for the communication (i.e., the active channel), a modulation and/or coding scheme used to transmit the communication.

In some instances, the primary AP may passively monitor communications when the primary AP and the subordinate AP use the same active channel for communicating. Alternatively, the primary AP may receive the communication when actively monitoring communications between other wireless devices, such as when scanning channels. The primary AP actively or passively monitoring communications may be referred to as sniffing. After the primary AP detects the communication between the client device and the subordinate AP, control flows to block 202.

Figure 5:
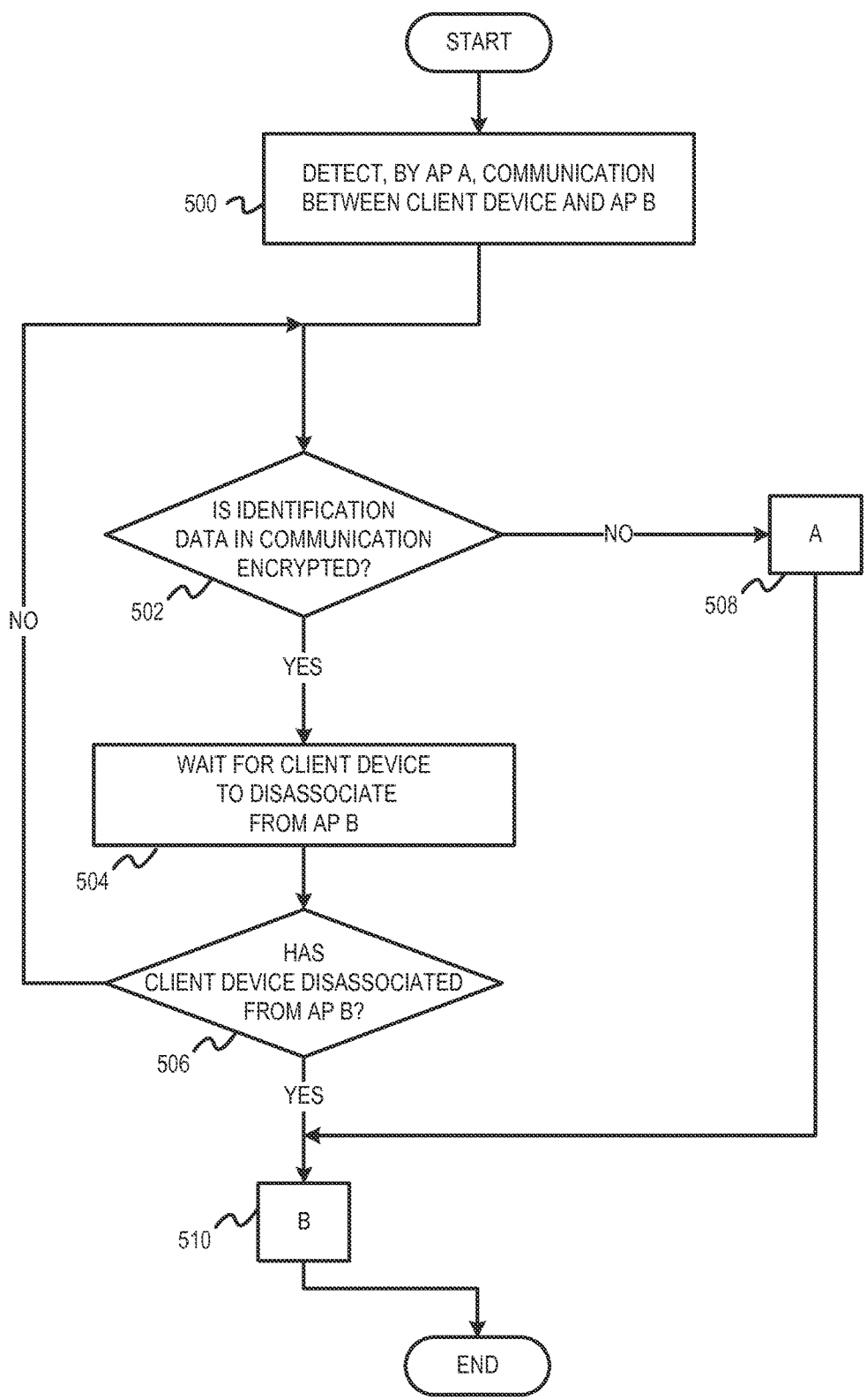
FIG. 5 depicts a flowchart of example operations including AP A that steers a client device from AP B to AP A and for AP steering using a blacklist in accordance with embodiments of this disclosure.

Control flows to block 202 either from block 200 or from block 214 (which connect to block 508 of FIG. 5). At block 202, the primary AP determines whether the client device has previously associated with a second network (e.g., a private network) administered by the primary AP. For example, the primary AP may search a data structure (e.g., table, list, database, etc.) to determine whether an identifier of the client device is included by the data structure. The identifier may be, for example, a MAC address associated with the client device. The identifier may be implemented by the identifying data extracted from the communication at block 200. If the primary AP determines that the client device has previously associated with the first network of the primary AP, control flows to block 204. If the primary AP determines that the client device has not previously associated with the first network of the primary AP, the process ends.

With reference to FIG. 1, AP A 104 may determine that the client device 102 has previously associated with the second network (e.g., the private network) administered by AP A 104. AP A 104 may maintain a client device identifier list including client device identifiers (e.g., MAC addresses) for all client devices that have associated with the second network. As noted, the identification information may include a source identifier and a destination identifier. AP A 104 may search the client device identifier list for instances of the source identifier and/or destination identifier. If the source identifier or the destination identifier is found in the client device identifier list, AP A 104 may determine that the client device 102 has previously associated with the second network.

At block 204, the primary AP determines whether at least one criteria for AP steering is satisfied. The at least one criteria may be considered to reduce the potential negative impact from performing AP steering under certain conditions. Various criteria may be used to determine whether AP steering should be performed. For example, the primary AP may determine whether the signal strength between the primary AP and the client device is above a particular threshold. The primary AP may determine whether modulation and coding scheme index is above a certain threshold, etc. Not all criteria for AP steering need be related to performance or signal quality. For example, one criteria may include an affiliation between a client device and a primary AP. If the primary AP determines that the at least one criteria for AP steering is satisfied, control flows to block 206. If the primary AP determines that the at least one criteria for AP steering is not satisfied, the process ends.

With reference to FIG. 1, AP A 104 may determines that at least one criteria for AP steering of the client device 102 is satisfied. The criteria may be used to identify scenarios in which AP steering may be inappropriate. Consider, for example, a scenario in which the signal strength between AP A 104 and the client device 102 is poor. If AP A 104 caused the client device 102 to disassociate from AP B 106, the client device 102 may try again to associate with AP B 106. However, if the client device 102 instead associates with AP A 104, the network performance as seen by the client device 102 may decrease. Thus, one of the criteria may include a threshold of the signal strength between AP A 104 and the client device 102. If the signal strength between AP A 104 and the client device 102 is below the threshold, the at least one criteria is not satisfied, and AP steering is not performed. The at least one criteria may include a quality of service (QoS) attribute being above a threshold. Examples of QoS attributes might include a throughput associated with a modulation and/or coding scheme, a signal strength, a wireless transmission delay, etc. Further, non-QoS criteria may also be used.

In some instances, AP steering is performed upon satisfaction of each and all of the criteria. In other instances, a subset of the criteria may be satisfied when determining to perform AP steering. For example, each of the criteria may be assigned a weight. For each one of the criteria that is satisfied, that criterion's weight is added to a sum. If the sum of the weights exceeds a threshold, AP A 104 performs the AP steering. In some instances, AP A 104 may require that certain criteria be satisfied before performing AP steering.

At block 206, the primary AP determines whether the client device is in a power save mode. In one embodiment, the primary AP may determine whether the client device uses the power save mode. The primary AP may make this determination by analyzing the communication that was detected at block 200. The primary AP may also make this determination by analyzing whether additional communication is transmitted between the client device and the subordinate AP. If the primary AP determines that the client device is in power save mode, control flows to block 208. If the primary AP determines that the client device is not in power save mode, control flows to block 212.

At block 208, the primary AP may determine whether the client device is in a sleep sub-state of the power save mode. In one embodiment, the power save mode includes an awake sub-state and a sleep sub-state. The client device may be in the awake sub-state for a brief amount of time, such as to communicate with the subordinate AP. At other times, the client device may be in the sleep sub-state. In another embodiment, the power save mode includes additional and/or different sub-states to the sleep sub-state. If the primary AP determines that the client device is in a sleep sub-state of the power save mode, control flows to block 210. If the primary AP determines that the client device is not in the sleep sub-state of the power save mode, control flows to block 212.

At block 210, the primary AP waits for a certain amount of time. In one embodiment, the primary AP waits for a predetermined amount of time, such as for a certain amount of milliseconds. In another embodiment, the primary AP dynamically determines the amount of time to wait, such as based on an analysis of the communication that was detected at block 200. In another embodiment, the primary AP makes this determination by analyzing the timing of additional communication that is transmitted between the client device and the subordinate AP.

At block 212, the primary AP transmits to the client device a disassociation message that identifies the subordinate AP. Thus, instead of identifying the primary AP, the disassociation message identifies the subordinate AP. The primary AP may transmit the disassociation message using various features compatible with the client device and the subordinate AP. For example, the primary AP may use a particular modulation and coding scheme index as determined from the communication detected at block 200. In other words, the primary AP attempts to mimic the communication detected at block 200, increasing the likelihood that the client device successfully receives and decodes the disassociation message. The primary AP transmitting the disassociation message that identifies the subordinate AP, thus mimicking the communication from the subordinate AP may be referred to as spoofing. After the primary AP transmits the disassociation message that identifies the subordinate AP to the client device, the process ends.

With reference to FIG. 1, AP A 104 may transmit a disassociation message 112 identifying AP B 106 to the client device 102. Thus, the disassociation message 112 does not identify AP A 104, but instead identifies AP B 106 as the sender. The dissociation message may cause the client device 102 to disassociate from AP B 106.

As noted, at block 200, the primary AP detects communications between the client device and other APs. If a certain communication identifies the primary AP as the destination, the primary AP may process the certain communication. If the communication identifies the subordinate AP as the destination, the primary AP recognizes the communication as being between two other devices.

Figure 3:
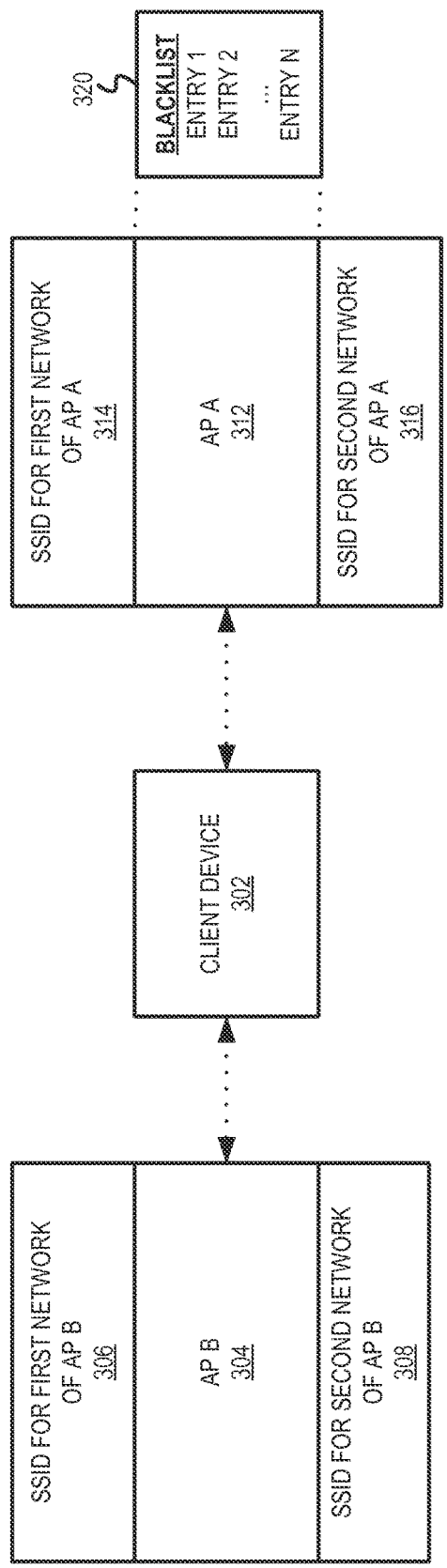
FIG. 3 depicts an example WLAN in which an AP steers a client device from a first network of the AP to a second network of the AP in accordance with embodiments of this disclosure.

FIG. 3 depicts a set of WLAN components including an AP that steers a client device from a first network (e.g., a public network) to a second network (e.g., a private network) using a blacklist. As described above, an AP may administer two networks, such as a public network and/or a private network. A private network is a network that may require credentials to access the network. For example, the credentials may be provisioned by a private network administrator, such as the owner or lessee of the AP that administers the private network. The credentials associated with a private network may be intended to limit access to the private network. In contrast to a private network, a public network is a network that allows any client device to associate with. Sometimes a public network is referred to as an open network, because the public network may not require any form of authentication for a client to associate with the public network. Another type of public network may be referred to as a semi-public network. A semi-public network may use widely distributed credentials that are not specific to a private network administrator. For example, a semi-public network may allow all customers of a particular Internet service provider (ISP) to access the semi-public network, regardless of whether a particular customer owns or leases the particular AP that administers the semi-public network.

Consider a scenario in which a particular ISP leases APs to customers. Each AP may administer a public network that allows any of client devices affiliated with the ISP's customers to associate with and use the public network, regardless of whether the customer is the lessee of the particular AP. For example, a particular AP may receive credentials from a client device that identifies the client device's owner as a customer of the ISP. The AP may then query an authentication server managed by the ISP to determine if the credentials are valid. If the credentials are valid, the AP may allow the client device to associate with the public network. Because the public network may be accessible to users other than the AP's lessee, the public network may impose various restrictions to the users, such as a throughput cap or content restrictions.

Each AP may also administer a private network. The private network may require credentials controlled by a particular AP's lessee. In other words, the ISP customer that leases the AP may restrict access to the private network to the client devices of his/her choice. Whereas the public network administered by the AP may impose various restrictions, the private network administered by the AP may provide unrestricted access.

To identify a particular network administered by an AP, each network may have a service set identifier ("SSID"). For example, an AP may have a public SSID associated with a public network (or semi-public network) and may have a private SSID associated with a private network. As noted above, the public network may include restrictions that do not apply to the private network. Thus, the private network may offer advantages over the public network. The private network may also provide more secure communication over the public network. In FIG. 3, AP steering may be used by an AP to cause a client device to transition from a public network to a private network.

FIG. 3 depicts a wireless system having client device 302, AP B 304, and AP A 312. In FIG. 3, the wireless system may implement a wireless communication protocol similar to the IEEE 802.11 wireless protocols. Alternatively, the wireless system may implement any wireless communication protocol compatible with the features described herein.

AP B 304 includes a first SSID 306 and a second SSID 308. The first SSID 306 may be associated with a public network administered by AP B 304. The second SSID 308 may be associated with a private network administered by AP B 304. AP A 312 includes a first SSID 314 and a second SSID 316. The first SSID 314 may be associated with a public network administered by AP A 312. The second SSID 316 may be associated with a private network administered by AP A 312. AP A 312 also maintains a blacklist 320. The networks administered by the AP A 314 can differ from each other by bandwidth, type, priority, and/or security, etc. Similarly, the networks administered by the AP B 306 can differ from each other by bandwidth, type, priority, and/or security, etc.

The client device 302 may initially associate with the first network administered by AP B 304. The client device 302 may associate with the first network of AP B 304 when the client device 302 is physically near AP B 304. The client device 302 may also receive a beacon message or probe response message from AP B 304. The client device 302 and AP B 304 may associate by performing operations including transmitting authentication messages, association requests/responses, etc. The operations may vary between protocols.

The client device 302 may then associate with the first network administered by AP A 312. While client device 302 is associated with AP B 304, the client device 302 may receive beacon messages from AP A 312 identifying the first network administered by AP A 312. Thus, the client device 302 may determine the first network administered by AP A 312 is accessible. The client device 302 may also determine that the first network administered by AP A 312 may provide better performance than the first network of AP B 304. In another example, the client device 302 may determine that the first network administered by AP A 312 has a higher priority than the first network of AP B 304. The client device 302 may then disassociate with AP B 304 and associate with AP A 312. AP A 312 may also send a disassociation message (for disassociation with AP B 304) to the client device 302 in the manner described with reference to FIGS. 1 and 2.

AP A 312 may steer the client device 102 from the first network (e.g., a public network) of AP A 312 to the second network (e.g., a private network) of AP A 312. AP A 312 may add the client device 302 to a blacklist 320. Once the client device 302 is added to the blacklist 320, AP A 312 may disassociate the client device 302. After the client device 302 is disassociated, the client device 302 may search for available networks on different channels or with different SSIDs. The client device 302 may then discover the second network of AP A 312 that is associated with the second SSID 316. If the client device 302 associates with the second network of AP A 312, AP A 312 may remove the client device 302 from the blacklist 320. If the client device 302 attempts to reassociate with the first network of AP A 312, AP A 312 may reject the association attempt. Upon the association attempt being rejected, the client device 302 may continue to search for available networks. AP A 312 may monitor the number of times the client device 302 attempts to reassociate with the first network of AP A 312. If AP A 312 determines that number of times the client device 302 attempts to reassociate is greater than a particular threshold, AP A 312 may allow the client device 302 to reassociate with the first network of AP A 312.

The example depicted in FIG. 3 assumes that the client device 302 transitions between the first network administered by AP A 312 and the second network administered by AP A 312. As described above, the client device 302 may select which network based on various network attributes (e.g., SSID, channel, and others). Other scenarios may also result in the client device 302 associating with the first network administered by AP A 312 instead of the second network administered by AP A 312. For example, the signal quality for the second network administered by AP A 312 may temporarily drop, thus resulting in the client device 302 associating with the first network administered by AP A 312. Alternatively, when the client device 302 is not currently associated with any networks and the second network administered by AP A 312 is temporarily unavailable, the client device 302 might associate with the first network administered by AP A 312. In such a scenario, the techniques may still be used to steer the client device 302 to the second network.

In some scenarios, AP A 312 may determine that AP steering using a blacklist should not be performed. For example, if the credentials to associate with the second network administered by AP A 312 change, AP A 312 may determine that AP steering should not be performed until the client device 302 has updated its credentials. This may prevent a "thrashing" scenario in which the blacklist functionality prevents the client device 302 from associating with the first network administered by AP A 312 and stale credentials prevents the client device 302 from associating with the second network administered by AP A 312. Because AP A 312 may not have control over the client device's 302 wireless roaming functionality, AP A 312 may not be capable of preventing all thrashing scenarios, but may decrease the probability by not performing AP steering when there is an increased probability of thrashing.

Whether AP steering using a blacklist should be performed may be indicated globally by a particular setting or variable. Thus, AP A 312 may check the value of the setting/variable prior to performing AP steering. Whether AP steering using a blacklist should be performed may be indicated for individual client devices using various techniques. In some instances, AP A 312 may maintain a list that identifies client devices for which AP steering should not be performed. In some instances, AP A 312 may remove a particular client device's identifier from the list indicating that the particular client device has previously associated with the second network (e.g., the private network) administered by AP A 312. For example, if the credentials for the second network administered by AP A 312 are changed, AP A 312 may remove client device identifiers from the list indicating which client devices have previously associated with its second network. When the client device 302 successfully associates with the second network administered by AP A 312, AP A 312 may add the client device's identifier to the list, thus enabling AP steering for the client device 302.

Figure 4:
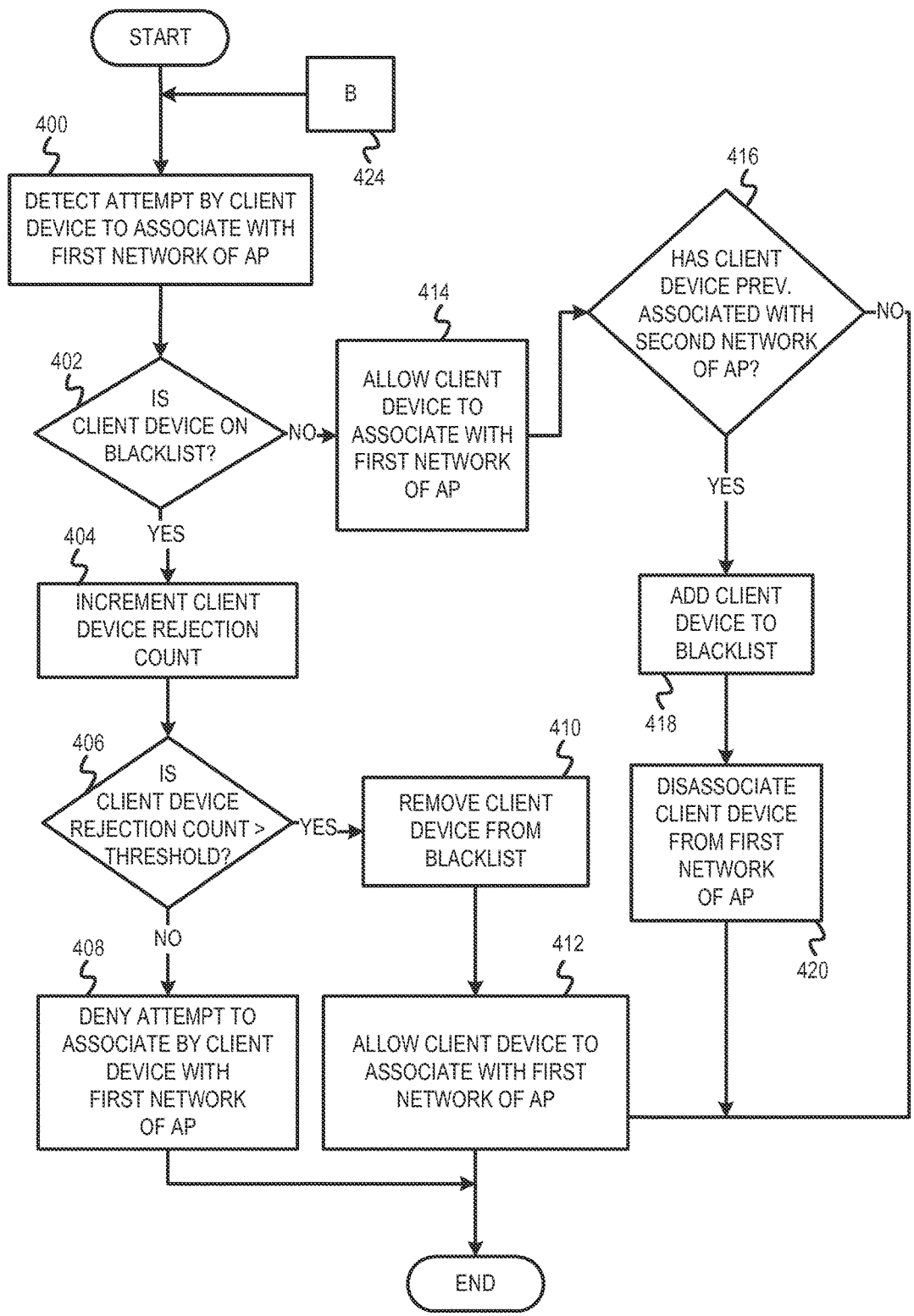
FIG. 4 depicts a flowchart of example operations for AP steering using a blacklist in accordance with embodiments of this disclosure.

FIG. 4 depicts a flowchart of example operations for AP steering using a blacklist. The operations depicted in FIG. 4 may be performed by a primary AP or any suitable wireless device. The process begins at block 400. However, the operations of FIG. 4 may also be performed after operations described in FIG. 5, which connects to block 424 of FIG. 4.

At block 400, an AP detects an attempt by a client device to associate with the AP. An association process may begin with a particular message. For example, the association process for IEEE 802.11 wireless protocols may begin with an authentication request from the client device to the AP. The AP may respond with an authentication response from the AP to the client device, followed by an association request from the client device to the AP. Thus, the AP may detect an attempt by the client device to associate with the AP when the AP receives an authentication request. In other protocols, the association process may begin with an association request message or other message. After the AP detects the attempt by the client device to associate with the AP, control flows to block 402. With reference to FIG. 3, AP A 312 may detect an attempt by the client device 302 to associate with a first network (e.g., a public network) of AP A 312. In one scenario, the client device 302 may attempt to re-associate with the first network of AP A 312 after the client device 302 is disassociated from the first network of AP A 312 (i.e., after block 420).

At block 402, the AP determines whether the client device is on a blacklist. To determine whether the client device is on the blacklist, the AP searches the blacklist for a client device identifier, such as a MAC address, associated with the client device. The blacklist may be implemented with a list, a table, or any suitable data structure. Thus, the particular technique used to search the blacklist for the client device identifier may vary. With reference to FIG. 3, AP A 312 may detect whether the client device 302 is on the blacklist 320. AP A 312 may extract the client device identifier of client device 302 from the association request of block 400. If the AP determines that the client device is on the blacklist, control flows to block 404. If the AP determines that the client device is not on the blacklist, control flows to block 414.

At block 404, the AP increments a client device rejection count associated with the client device. The client device rejection count may be stored with the client device identifier in the blacklist, or separately as part of another data structure. After the AP increments the client device rejection count associated with the client device, control flows to block 406.

At block 406, the AP determines whether the client device rejection count is greater than a threshold. The threshold may be static or dynamic. If the client device rejection count is greater than the threshold, control flows to block 410. If the client device rejection count is less than or equal to the threshold, control flows to block 408.

At block 408, the AP denies the client device's association attempt. The particular operations performed by the AP may vary. For example, if the AP implements an IEEE 802.11 wireless protocol, the AP may transmit an authentication reject message. In some instances, the AP may transmit a disassociation message, an association reject message, and/or other message. With reference to FIG. 3, AP A 312 may transmit an authentication rejection message (and/or other message) to the client device 302. In one embodiment, the authentication rejection message may instruct the client device to associate with a second network (e.g., a private network) of the AP. In some instances, AP A 312 may reject the association attempt by not granting the association attempt. After the AP denies the client device's association attempt, the process ends.

At block 410, the AP removes the client device identifier from the blacklist. This allows the client device to associate with the first network administered by the AP, and prevents a scenario in which the client device may not associate with any network administered by the AP. With reference to FIG. 3, AP A 312 removes the client device identifier associated with the client device 302 from the blacklist 320. After the AP removes the client device from the blacklist, control flows to block 412.

At block 412, the AP allows the client device to associate with the AP. The particular operations may vary. For example, if the AP implements an IEEE 802.11 wireless protocol, the AP may transmit an authentication accept message. In some instances, the AP may transmit an association allow message or another message. With reference to FIG. 3, AP A 312 allows the client device 302 to associate with the first network of AP A 312. After the AP allows the client device to associate with the first network of the AP, the process ends.

At block 414, the AP allows the client device to associate with the AP. The operations of block 414 may be similar to that of block 412. For example, if the AP implements an IEEE 802.11 wireless protocol, the AP may transmit an authentication accept message. In some instances, the AP may transmit an association allow message or another message. With reference to FIG. 3, AP A 312 allows the client device 302 to associate with the first network of AP A 312. After the AP allows the client device to associate with the first network of the AP, control flows to block 416.

At block 416, the AP determines whether the client device has associated with the second network administered by the AP previous to the current association. To determine whether the client device has previously associated with the second network administered by the AP, the AP may search a list or other data structure that identifies client devices that have previously associated with the second network. The list may be a list of MAC addresses or other client device identifiers. Thus, the AP may search the list for the client device's MAC address extracted from a message received at block 400. If the AP determines that the client device has previously associated with the second network administered by the AP, control flows to block 418. If the AP determines that the client device has not previously associated with the second network administered by the AP, the process ends.

With reference to FIG. 3, AP A 312 may determine whether the client device 302 has previously associated with the second network administered by AP A 312. If the client device 302 previously associated with the second network, AP A 312 stores a client device identifier (e.g., a MAC address) for the client device 302. AP A 312 may store the client device identified in a list, table, or other suitable data structure. Thus, if the client device identifier is stored (e.g., in a list), AP A 312 determines that the client device 302 has previously associated with the second network of AP A 312.

At block 418, the AP adds the client device identifier to the blacklist. As described above, the client device may be identified by a MAC address associated with the client device. The blacklist may be implemented as a list, a table, or other suitable data structure. Thus, the particular operations performed to add the identifier to the blacklist may vary depending on the implementation of the blacklist. With reference to FIG. 3, AP A 312 may add the client device identifier associated with the client device 302 to the blacklist 320. After the client device has been added to the blacklist, control flows to block 420.

At block 420, the AP disassociates the client. The particular operations may vary. For example, if the AP implements an IEEE 802.11 wireless protocol, the AP may transmit a disassociation message. If the AP implements another protocol, the AP may transmit a particular message defined by the protocol. After the AP disassociates the client, the process ends.

With reference to FIG. 3, AP B 304 may transmit a disassociation message to the client device 302. Unlike the disassociation message described with reference to FIGS. 1 and 2, the disassociation message of block 420 identifies the actual transmitting AP (e.g., AP A 312). Besides identifying the transmitting AP, the data included in the disassociation message may vary between protocols. Examples of other data that may be included in the disassociation message include the SSID of the first network, an identifier for the client device 302, etc.

The client device may be removed from the blacklist when the client device successfully associates with the second network of the AP. The client device may also be removed from the blacklist in response to the client device rejection count being greater than a particular threshold (e.g., at block 410). When the client device is removed from the blacklist, the client device rejection count may be reset to zero. AP A 312 may also remove the client device 302 from the blacklist if the client device 302 attempts to re-associate with the second network of AP A 312 a certain number of times. Thus, if the client device 302 fails to associate with the second network after a certain number of attempts, the client device 302 is not denied a network connection.

The process illustrated by FIGS. 3 and 4 depict the client device associating with the first network administered by the AP prior to steering the client device to the second network administered by the same AP. Alternatively, the AP might deny a request by the client device to associate with the first network administered by the AP.

FIG. 5 depicts a flowchart of example operations including AP A that steers a client device from AP B to AP A and for AP steering using a blacklist. FIG. 5 illustrates an embodiment of the disclosure that accounts for encrypted communication between the client device and AP B.

At block 500, AP A detects communication between the client device and AP B. Block 500 may be substantially similar to block 200.

At block 502, AP A determines whether identification data is encrypted in the communication. For example, AP B and the client device may communicate using encrypted management frames. If the identification data is encrypted, then AP A may not be able to analyze and/or extract the identification data from the communication. Thus, AP A may not be able to identify the client device and the subordinate AP (i.e., AP B). If AP A determines that the identification data is encrypted, control flows to block 504. If AP A determines that the identification data is not encrypted, control flows to block 508. At block 508 (marked as "A"), control flows to block 214 of FIG. 2.

At block 504, AP A waits for the client device to dissociate from AP B. In one embodiment, AP A may wait for a predetermined amount of time. In another embodiment, AP A may dynamically adjust the wait time based on, for example, wireless roaming functionality associated with AP A and/or the client device.

At block 506, AP A determines whether the client device has disassociated from AP B. AP A may make this determination based on, for example, messages from the client device looking for association with a new AP. AP A may also make this determination based on the client device not using encrypted communication. If AP A determines that the client device has disassociated from AP B, control flows to block 510. At block 510 (marked as "B"), control flows to block 424 of FIG. 4.

If AP A determines that the client device has not disassociated from AP B, control flows to block 502. After performing the operations of FIG. 4 at block 510, the process ends.

An AP may also implement AP steering by providing information to the client device about other nearby APs. The nearby APs may be out of range of the client device. In particular, a first AP detects a beacon message from a second AP. The first AP stores data identifying the second AP and/or networks administered by the second AP. Subsequently, when the first AP transmits a beacon message identifying the first AP, the first AP also includes the data identifying the second AP and/or networks administered by the second AP. Thus, if a client device is in range of the first AP but not within the range of the second AP, the client device may still determine that networks administered by the second AP are nearby. The data identifying the second AP and/or networks administered by the second AP may include data that specifies which channels the second AP is operating on. Upon receiving the beacon message, the client device may more efficiently search for the second AP.

Figure 6:
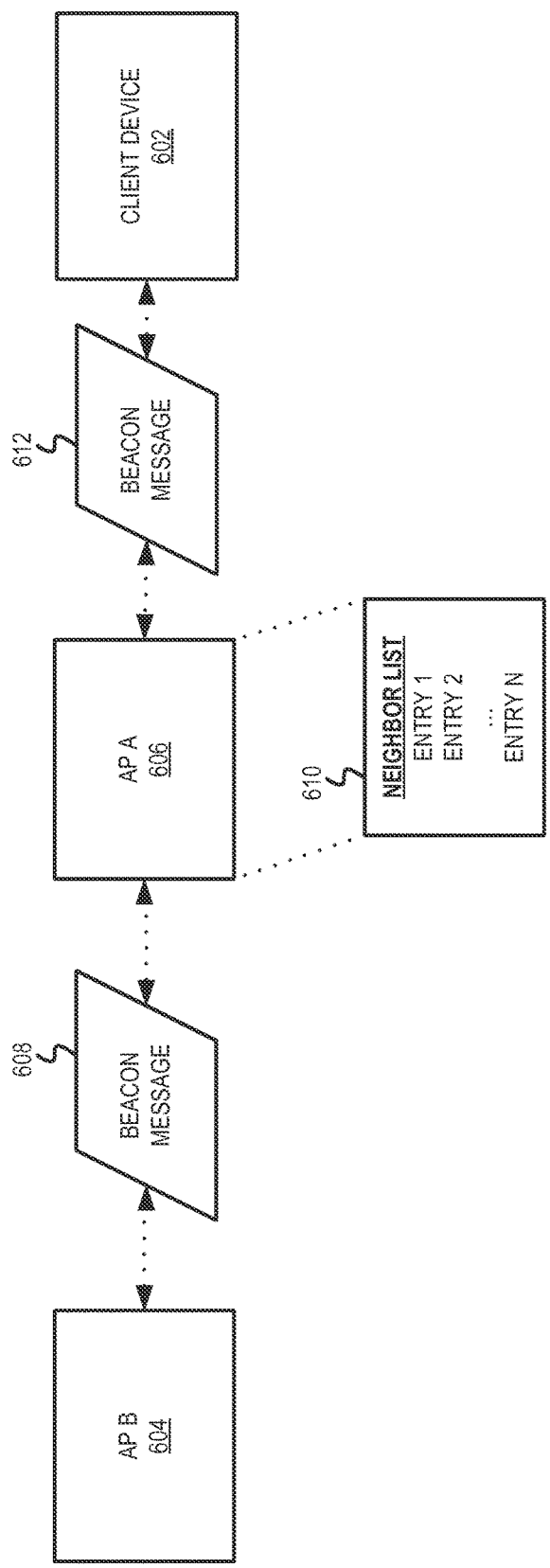
FIG. 6 depicts a set of WLAN components including AP A that identifies AP B in a beacon message in accordance with embodiments of this disclosure.

FIG. 6 depicts a client device 602, AP B 604, and AP A 606 (collectively "wireless devices"). FIG. 6 depicts a set of WLAN components including an AP that identifies other APs in a beacon message.

AP B 604 may transmit a beacon message 608 identifying one or more networks administered by AP B 604. For example, AP B 604 may administer two networks, such as a public network and a private network. AP B 604 may transmit an individual beacon message for each network on the channel associated with each particular network. As another example, a single beacon message 608 may include the SSID, the channel, and other identifying data associated with each other network administered by AP B 604.

AP A 606 may detect the beacon message 608 transmitted by AP B 604 For example, while the radio used by AP A 606 may normally be tuned to a particular channel, AP A 606 may periodically scan other channels. AP A 606 may receive beacon messages for any network using the particular channel. While the radio is periodically scanning other channels, AP A 606 may receive beacon messages for any networks using the channels being scanned. The beacon message may identify the SSID associated with the network and indicate functionality supported by AP A 606.

After detecting the beacon messages transmitted by AP B 604, AP A 606 may add beacon data of the beacon message to a neighbor list 610. The beacon data may include the SSID of AP B 604. The neighbor list 610 may be implemented as a list, table, or other suitable data structure. The neighbor list 610 may identify networks administered by APs within range of AP A 606. The neighbor list 610 may indicate other data, such as a channel associated with each SSID, capabilities of AP B 604, etc.

AP A 606 may then transmit a beacon message 612 to the client device 602. The beacon message 612 may identify a network administered by AP B 604, as well as any other networks stored in the neighbor list 610. In one embodiment, the beacon message 612 includes the SSID of AP B 604, and optionally other data useful in associating with the networks.

The client device 602 may detect the beacon message 612 transmitted by AP A 606. The client device 602 may then extract the data identifying the networks administered by AP B 604 from the beacon message. The client device 602 may incorporate the information identifying AP B 604 into wireless roaming functionality. The particular impact that the information may have on the wireless roaming functionality may vary between implementations. For example, the client device 602 may proceed to associate with AP A 606. The client device 602 may continue to search for available APs including AP B 604.

Figure 7:
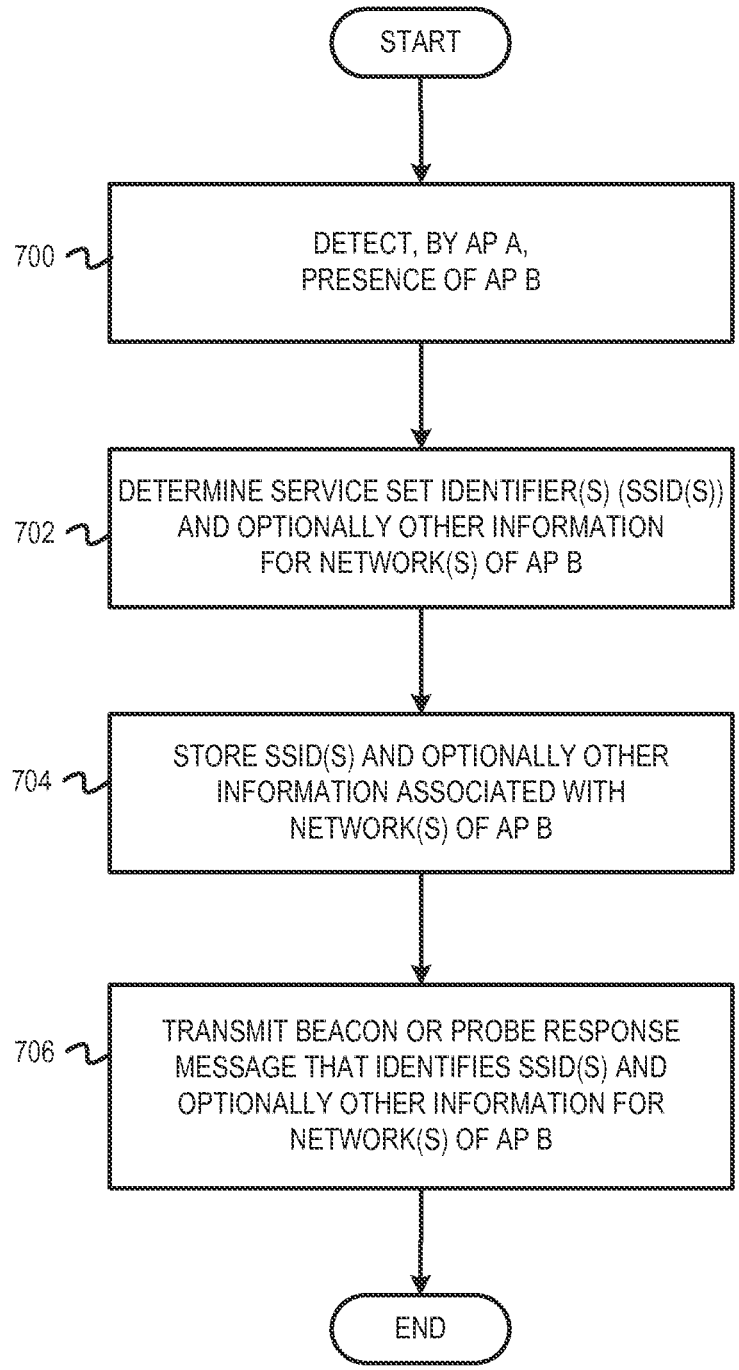
FIG. 7 depicts a flowchart of example operations for AP steering using beacon or probe response messages in accordance with embodiments of this disclosure.

FIG. 7 depicts a flowchart of example operations for embedding neighbor AP information in beacon or probe response messages. The operations depicted in FIG. 7 may be performed by a primary AP or any suitable device.

At block 700, a first AP detects the presence of a second AP. The presence of the second AP may be detected using various techniques. For example, the first AP may detect a beacon message transmitted by the second AP or receive a probe response from the second AP. After the first AP detects the presence of the second AP, control flows to block 702.

At block 702, the first AP determines one or more SSIDs and other information related to networks administered by the second AP. The first AP may determine the SSIDs and other information based on message(s) received at block 700. In one embodiment, because beacon messages and probe response messages may be channel-specific, the first AP may scan other channels to determine other SSIDs and information associated with networks other than any identified at block 700. After the first AP determines the SSIDs and other information, control flows to block 704.

At block 704, the first AP stores the SSIDs and other information related to networks administered by the second AP. The SSIDs and other information may be stored in a table or other suitable data structure. After the first AP stores the SSIDs and other information, control flows to block 706.

At block 706, the first AP transmits a beacon or probe response message that identifies the SSIDs and other information determined at block 702. Thus, the beacon or probe response message identifies at least one network administered by the first AP and at least one network administered by the second AP. A beacon message may be transmitted periodically. A probe response message may be transmitted in response to a probe request message. After the first AP transmits the beacon or probe response message that the SSIDs and other information, the process ends.

The term "message" is used herein to describe communications between devices. Different protocols may refer to similar constructs differently. For example, the IEEE 802.11 wireless protocols define various types of "frames," which are functionally similar to the messages described above. Some protocols may use the term "packet" to define similar constructs. The techniques described above apply to protocols whether the protocols use the term "message," "frame," "packet," or other term.

As example flowcharts, FIGS. 2, 4, 5, and 7 present operations in an example order from which storage systems may deviate (e.g., operations may be performed in a different order than illustrated and/or in parallel; additional or fewer operations may be performed, etc.).

In some embodiments, the above-described techniques may be implemented without modifications to software and/or hardware of a client device. Communication protocols used by the APs and client device may not need to be modified either. In one embodiment, only one AP is modified to perform AP steering described herein. For example, software and/or hardware may be modified in an AP or other apparatus configured to implement the AP steering.

As will be appreciated by one skilled in the art, embodiments of the present subject matter may be embodied as a system, method, or program code/instructions embodied in one or more machine-readable media. Accordingly, embodiments may take the form of a hardware embodiment, a software embodiment (including firmware, resident software, micro-code, etc.) or an embodiment combining software and hardware embodiments that may all generally be referred to herein as a "circuit," "module" or "system."

Any combination of one or more non-transitory machine readable medium(s) may be utilized. Non-transitory machine-readable media comprise all machine-readable media, with the sole exception being a transitory, propagating signal. The non-transitory machine readable medium may be a computer readable storage medium. A machine readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the machine readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a machine readable storage medium may be any tangible medium that may contain, or store a program for use by or in connection with an instruction execution system, apparatus, or device.

Program instructions/code embodied on a machine readable medium for carrying out operations for embodiments of the subject matter may be written in any combination of one or more programming languages, including an object oriented programming language such as Java, Smalltalk, C++ or the like and conventional procedural programming languages, such as the "C" programming language or similar programming languages. The program code may execute entirely on a single machine or may execute across multiple machines.

Embodiments of the subject matter are described with reference to flowchart illustrations and/or block diagrams of methods, apparatus (systems) and program instructions according to embodiments of the present subject matter. Each block of the flowchart illustrations and/or block diagrams, and combinations of blocks in the flowchart illustrations and/or block diagrams, may be implemented by program instructions. These program instructions may be provided to a processor of a general purpose computer, special purpose computer, or other programmable apparatus to produce a machine, such that the instructions, which execute via the processor of the computer or other programmable apparatus, create means for implementing the functions/acts specified in the flowchart and/or block diagram block or blocks.

These program instructions may also be stored in a machine readable medium that may direct any of a variety of machines (e.g., apparatus, device, etc.) to function in a particular manner, such that the instructions stored in the machine readable medium produce an article of manufacture including instructions which implement the function/act specified in the flowchart and/or block diagram block or blocks.

Figure 8:
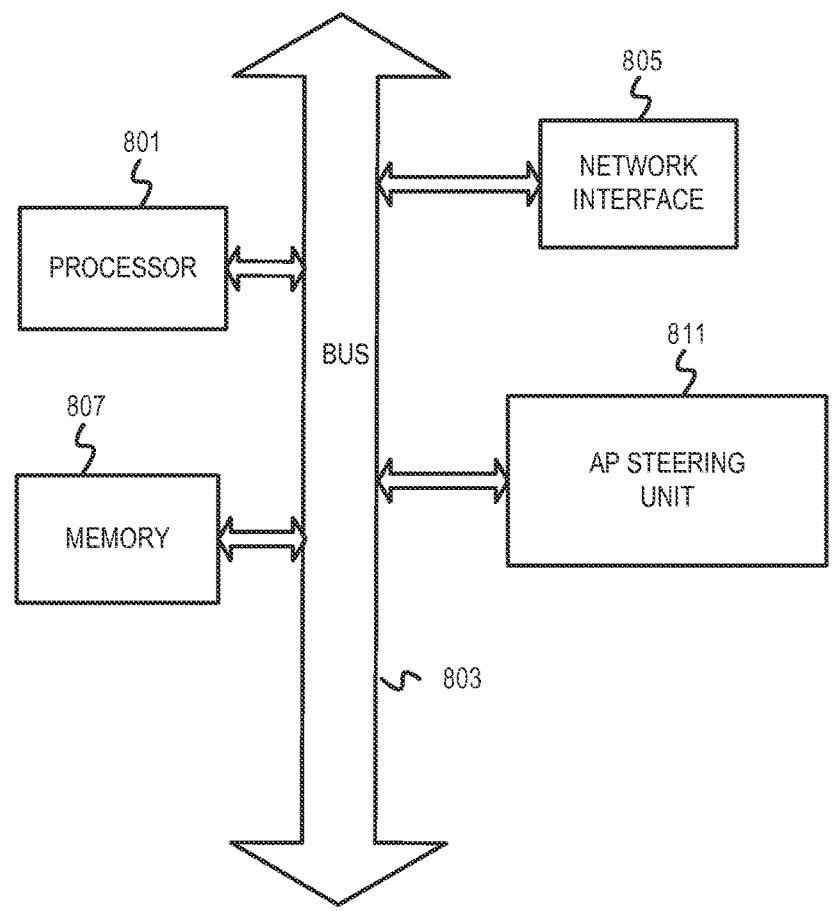
FIG. 8 is a block diagram of an embodiment of an electronic device for implementing AP steering in accordance with embodiments of this disclosure.

FIG. 8 is a block diagram of an embodiment of an electronic device 800 including an AP steering unit. In some implementations, the electronic device 800 may be an AP that is configured to perform AP steering. The electronic device 800 includes a processor 801 (possibly including multiple processors, multiple cores, multiple nodes, and/or implementing multi-threading, etc.). The electronic device 800 includes a memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above described possible realizations of non-transitory machine-readable storage media. The electronic device 800 also includes a bus 803 (e.g., PCI, ISA, PCI-Express, HyperTransport®, Infini-Band®, NuBus®, AHB, AXI, etc.). The electronic device 800 also includes a network interface 805 that include a wireless network interface (e.g., a WLAN interface, a Bluetooth® interface, a WiMAX® interface, a ZigBee® interface, a Wireless Universal Serial Bus interface, etc.) and/or a wired network interface (e.g., a Powerline Communications interface, an Ethernet interface, etc.).

The electronic device 800 also includes an AP steering unit 811. As described above in FIGS. 1 and 2, the AP steering unit 811 may detect communications between an AP and a client device and transmit a disassociation message identifying the AP to the client device. As described above in FIGS. 3 and 4, the AP steering unit 811 may determine that a client device is associated with a first network administered by the electronic device 800, add the client device to a blacklist, and transmit a disassociation message to the client device. As described above in FIGS. 5 and 6, the AP steering unit may detect networks associated with the AP and identify the detected networks in a beacon message.

Any one of these functionalities may be partially (or entirely) implemented in hardware and/or on the processor 801. For example, the functionality may be implemented with an application specific integrated circuit, in logic implemented in the processor 801, in a co-processor on a peripheral device or card, etc. In some embodiments, the AP steering unit 811 may be implemented on a system-on-a-chip (SoC), an application specific integrated circuit (ASIC), or another suitable integrated circuit to enable communications of the electronic device 800. In some embodiments, the AP steering unit 811 may include additional processors and memory, and may be implemented in one or more integrated circuits on one or more circuit boards of the electronic device 800. Further, realizations may include fewer or additional components not illustrated in FIG. 8 (e.g., video cards, audio cards, additional network interfaces, peripheral devices, etc.). For example, in addition to the processor 801 coupled with the bus 803, the AP steering unit 811 may include at least one additional processor. As another example, although illustrated as being coupled to the bus 803, the memory 807 may be coupled to the processor 801.

While the embodiments are described with reference to various implementations and exploitations, these embodiments are illustrative and that the scope of the present subject matter is not limited to them. In general, techniques for AP steering as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the present subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present subject matter.

What is claimed is:

1. A method performed by a first access point (AP) for steering a client device from a second AP to the first AP, the method comprising:
   detecting a first message between the client device and the second AP, the first message indicative that the client device is wirelessly associated with the second AP, wherein a first network administered by the first AP is different from a second network administered by the second AP;
   determining that the first AP is a primary AP for the client device based, at least in part, on a list of previous associations between the client device and the first network administered by the first AP;
   determining to steer the client device from the second AP to the first AP in response to a determination that the first AP is the primary AP for the client device; and
   transmitting a disassociation message from the first AP to the client device, wherein, instead of identifying the first AP as a sender of the disassociation message, the disassociation message identifies the second AP as the sender of the disassociation message, and wherein the disassociation message is transmitted in response to said determining to steer the client device from the second AP to the first AP.

2. The method of claim 1, further comprising:
   generating, by the first AP, the disassociation message to mimic a communication from the second AP to the client device.

3. The method of claim 2, wherein
   said transmitting the disassociation message from the first AP to the client device causes the client device to disassociate from the second AP.

4. The method of claim 1 further comprising, after said transmitting the disassociation message to the client device, receiving, by the first AP, an association request from the client device.

5. The method of claim 1, wherein determining that the first AP is the primary AP for the client device includes:
   determining that the second AP is not the primary AP for the client device based.

6. The method of claim 1, further comprising maintaining the list of previous associations between the client device and the first network administered by the first AP.

7. The method of claim 1, wherein the first network is a private network comprising credentials to limit access to the private network.

8. The method of claim 1, wherein said determining to steer the client device from the second AP to the first AP further comprises:
   determining that a quality of service attribute associated with the first AP is greater than a threshold; and
   determining that the client device is not currently associated with the first AP.

9. The method of claim 8, wherein the quality of service attribute comprises at least one member selected from a group consisting of: a signal strength between the first AP and the client device, a wireless transmission delay, and a throughput associated with a modulation and coding scheme used for communications between the first AP and the client device.

10. A first access point (AP), comprising:
a processor;
a wireless network interface coupled with the processor; and
a memory having instructions stored therein which, when executed by the processor, cause the first AP to:
  detect a first message between a client device and a second AP, the first message indicative that the client device is wirelessly associated with the second AP, wherein a first network administered by the first AP is different from a second network administered by the second AP;
  determine that the first AP is a primary AP for the client device based, at least in part, on a list of previous associations between the client device and the first network administered by the first AP;
  determine to steer the client device from the second AP to the first AP in response to a determination that the first AP is the primary AP for the client device; and
  transmit a disassociation message from the first AP to the client device, wherein, instead of identifying the first AP as a sender of the disassociation message, the disassociation message identifies the second AP as the sender of the disassociation message, and wherein the disassociation message is transmitted in response to a determination to steer the client device from the second AP to the first AP.

11. The first AP of claim 10, wherein the instructions to determine that the first AP is the primary AP for the client device include instructions which, when executed by the processor, cause the first AP to:
  determine that the second AP is not the primary AP for the client device.

12. The first AP of claim 10, wherein the instructions, when executed by the processor, cause the first AP to maintain the list of previous associations between the client device and the first network administered by the first AP.

13. The first AP of claim 10, wherein the instructions to cause the first AP to determine to steer the client device from the second AP to the first AP comprise instructions which, when executed by the processor, further cause the first AP to:
  determine that a quality of service attribute associated with the first AP is greater than a threshold; and
  determine that the client device is not currently associated with the first AP.

14. A non-transitory machine-readable medium comprising instructions, which when executed by a processor of a first access point (AP) for steering a client device from a second AP to the first AP, cause the first AP to:
  detect a first message between the client device and the second AP, the first message indicative that the client device is wirelessly associated with the second AP, wherein a first network administered by the first AP is different from a second network administered by the second AP;
  determine that the first AP is a primary AP for the client device based, at least in part, on a list of previous associations between the client device and the first network administered by the first AP;
  determine to steer the client device from the second AP to the first AP in response to a determination that the first AP is the primary AP for the client device; and
  transmit a disassociation message from the first AP to the client device, wherein, instead of identifying the first AP as a sender of the disassociation message, the disassociation message identifies the second AP as the sender of the disassociation message, and wherein the disassociation message is transmitted in response to a determination to steer the client device from the second AP to the first AP.

15. The non-transitory machine-readable medium of claim 14, wherein the instructions to determine that the first AP is the primary AP for the client device include instructions which, when executed by the processor, cause the first AP to:
  determine that the second AP is not the primary AP for the client device.

16. The non-transitory machine-readable medium of claim 14, wherein the instructions, when executed by the processor, cause the first AP to maintain the list of previous associations between the client device and the first network administered by the first AP.

17. The non-transitory machine-readable medium of claim 14, wherein the first network is a private network comprising credentials to limit access to the private network.

18. The non-transitory machine-readable medium of claim 14, wherein the instructions to determine to steer the client device from the second AP to the first AP further comprises:
  instructions to determine that a quality of service attribute associated with the first AP is greater than a threshold; and
  instructions to determine that the client device is not currently associated with the first AP.

19. The non-transitory machine-readable medium of claim 18, wherein the quality of service attribute comprises at least one member selected from a group consisting of a signal strength between the first AP and the client device, a wireless transmission delay, and a throughput associated with a modulation and coding scheme used for communications between the first AP and the client device.

20. The non-transitory machine-readable medium of claim 14, wherein the instructions further comprise instructions to, after transmission of the disassociation message to the client device, receive an association request from the client device.

21. The non-transitory machine-readable medium of claim 14, wherein the instructions further comprise instructions to:
  determine a first network identifier associated with the first network administered by the first AP;
  determine a second network identifier associated with the second network administered by the second AP based, at least in part, on the first message, wherein the second network identifier is different from the first network identifier; and
  transmit a second message to the client device, the second message including the first network identifier and the second network identifier.

22. The non-transitory machine-readable medium of claim 21, wherein the second message comprises a beacon message or probe response message.

23. The non-transitory machine-readable medium of claim 14, wherein the instructions further comprise instructions to:
  generate, by the first AP, the disassociation message to mimic a communication from the second AP to the client device.

24. The method of claim 1, wherein said determining to steer the client device from the second AP to the first AP further comprises determining that the first network has a first priority that is higher than a second priority for the second network.

25. The method of claim 1, further comprising:
determining a first network identifier associated with the first network administered by the first AP;
determining a second network identifier associated with the second network administered by the second AP based, at least in part, on the first message, wherein the second network identifier is different from the first network identifier; and
transmitting a second message to the client device, the second message including the first network identifier and the second network identifier.

26. The method of claim 25, wherein the second message comprises a beacon message or probe response message.

27. The first AP of claim 10, wherein the instructions, when executed by the processor, cause the first AP to:
generate, by the first AP, the disassociation message to mimic a communication from the second AP to the client device.

28. The first AP of claim 10, wherein the instructions, when executed by the processor, cause the first AP to:
determine a first network identifier associated with the first network administered by the first AP;
determine a second network identifier associated with the second network administered by the second AP based, at least in part, on the first message, wherein the second network identifier is different from the first network identifier; and
transmit a second message to the client device, the second message including the first network identifier and the second network identifier.

29. The first AP of claim 28, wherein the second message comprises a beacon message or probe response message.

30. A first access point (AP) for steering a client device from a second AP to the first AP, the first AP comprising:
means for detecting a first message between the client device and the second AP, the first message indicative that the client device is wirelessly associated with the second AP, wherein a first network administered by the first AP is different from a second network administered by the second AP;
means for determining that the first AP is a primary AP for the client device based, at least in part, on a list of previous associations between the client device and the first network administered by the first AP;
means for determining to steer the client device from the second AP to the first AP in response to a determination that the first AP is the primary AP for the client device; and
means for transmitting a disassociation message from the first AP to the client device, wherein, instead of identifying the first AP as a sender of the disassociation message, the disassociation message identifies the second AP as the sender of the disassociation message, and wherein the disassociation message is transmitted in response to said means for determining to steer the client device from the second AP to the first AP.

31. The first AP of claim 30, further comprising:
means for generating, by the first AP, the disassociation message to mimic a communication from the second AP to the client device.

32. The first AP of claim 30, further comprising:
means for determining a first network identifier associated with the first network administered by the first AP;
means for determining a second network identifier associated with the second network administered by the second AP based, at least in part, on the first message, wherein the second network identifier is different from the first network identifier; and
means for transmitting a second message to the client device, the second message including the first network identifier and the second network identifier.

33. The first AP of claim 32, wherein the second message comprises a beacon message or probe response message.

* * * * *